United States Patent
Eriksson et al.

(10) Patent No.: US 6,319,609 B1
(45) Date of Patent: Nov. 20, 2001

(54) METHOD FOR PRODUCING SOUND ABSORBING UNITS

(75) Inventors: Berndt Eriksson, Ronninge; Berne Geewe, Hagersten, both of (SE)

(73) Assignee: Zeta Innovation HB, Hagerstein (SE)

( * ) Notice: Subject to any disclaimer, the term of this patent is extended or adjusted under 35 U.S.C. 154(b) by 0 days.

(21) Appl. No.: 09/367,867

(22) PCT Filed: Mar. 3, 1998

(86) PCT No.: PCT/SE98/00380
§ 371 Date: Sep. 3, 1999
§ 102(e) Date: Sep. 3, 1999

(87) PCT Pub. No.: WO98/39149
PCT Pub. Date: Sep. 11, 1998

(30) Foreign Application Priority Data

Mar. 6, 1997 (SE) .................................................. 9700799

(51) Int. Cl.$^7$ .................................................. B29C 39/02
(52) U.S. Cl. .................... 428/407; 264/112; 264/115; 264/912
(58) Field of Search ............................. 264/35, 112, 115, 264/912; 428/323, 327, 403, 407

(56) References Cited

U.S. PATENT DOCUMENTS

| 5,094,905 | * | 3/1992 | Murray | 428/218 |
| 5,106,554 | * | 4/1992 | Drews | 264/112 |
| 5,316,708 | * | 5/1994 | Drews | 264/40.5 |
| 5,439,735 | * | 8/1995 | Jamison | 428/255 |
| 5,800,754 | * | 9/1998 | Woods | 264/115 |
| 6,017,472 | * | 1/2000 | Mack et al. | 264/28 |

* cited by examiner

Primary Examiner—Mary Lynn Theisen
(74) Attorney, Agent, or Firm—Bacon & Thomas, PLLC

(57) ABSTRACT

A method for producing sound absorbing, vibration-damping and/or heat/cold insulating units (1) of rubber waste from for example tyres. The material is decomposed and mixed with a binding agent and is solidified in a mould. The units can be used as noise protecting screens along roads. Holder means (2) and lifting means (4) can be imbedded in the material before the solidification.

9 Claims, 2 Drawing Sheets

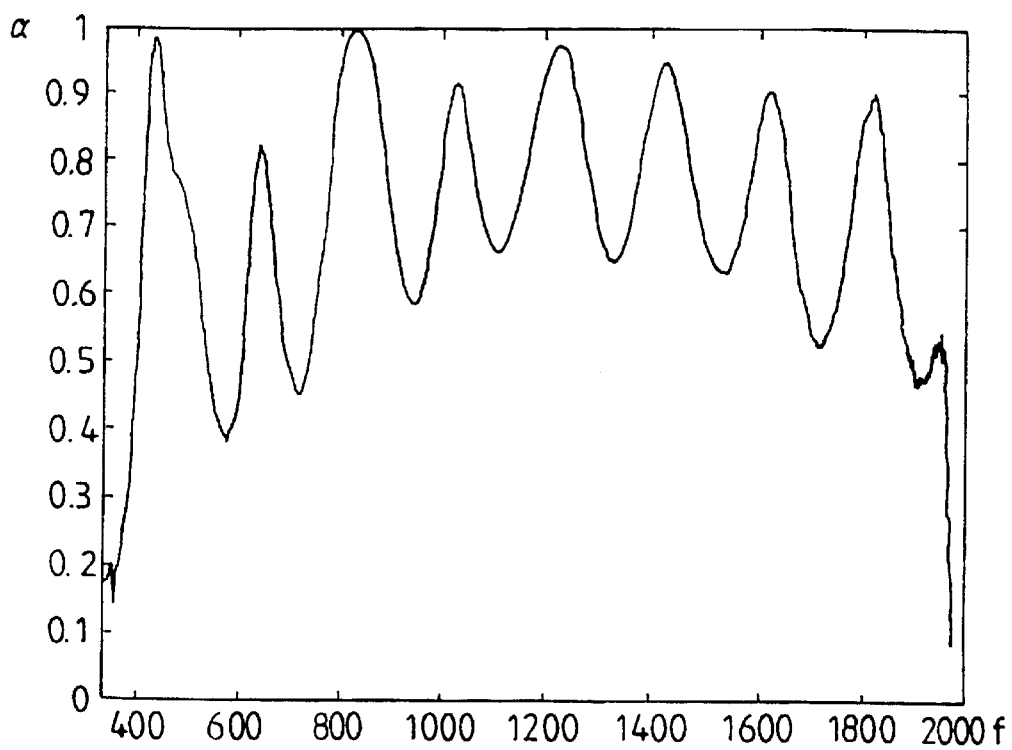
FIG. 4 Absorption factor rubber thickness 30 cm
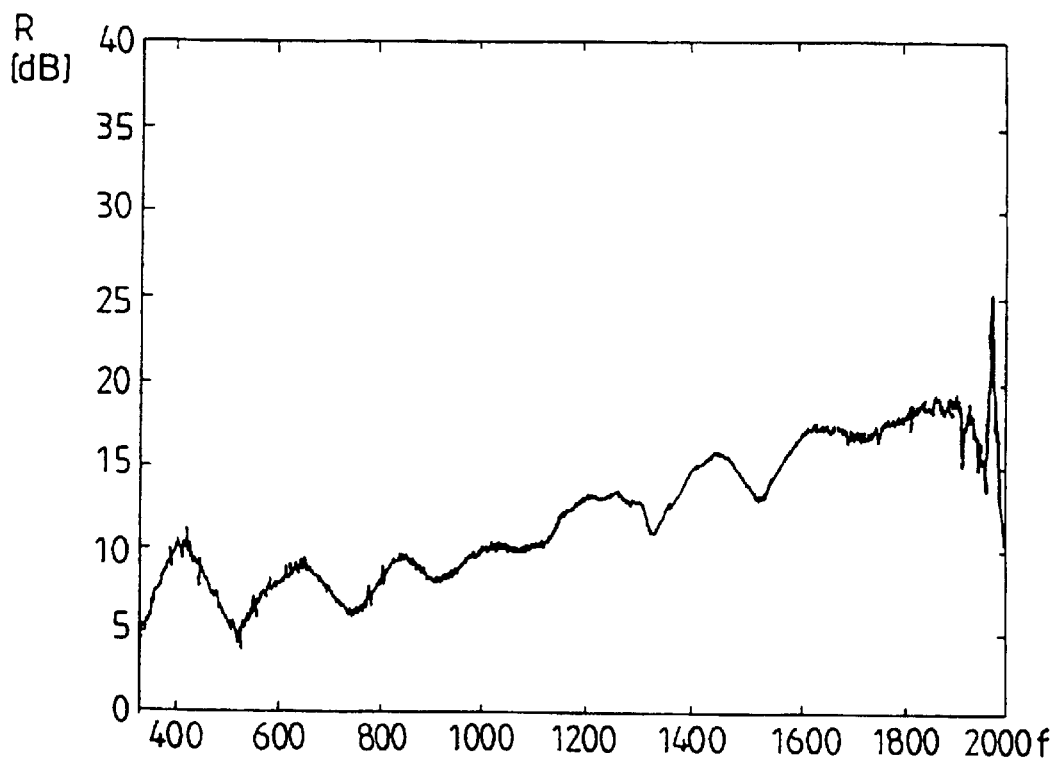
FIG. 5 Reduction coefficient rubber thickness 30 cm

METHOD FOR PRODUCING SOUND ABSORBING UNITS

TECHNICAL FIELD

This invention relates to a method for producing sound absorbing, vibration-damping and/or heat/cold insulating units of rubber waste from for example tyres, which units are usable among others as noise protections along roads and railways or as insulating plates in buildings.

PRIOR ART

It is known to press together or mould rubber waste to a porous material which can be used for sound absorption or insulation. See SE-A-9603951-6. The present invention relates to a development of this idea and involves a new method for producing units of decomposed rubber waste from for example tyres.

BRIEF DESCRIPTION OF THE INVENTION

Thus, the invention relates to a method for producing sound absorbing, vibration-damping and/or heat/cold insulating units of rubber waste from for example tyres. The invention is characterised in that the rubber waste is decomposed to a desired degree and thereafter mixed with a binder, after which the mixture is formed to said units and is solidified. The binding agent has to be of the type such that the units are elastic even after the solidification.

As the binding agent, a bicomponent glue can be used, which is non-rigid or "soft" even after cold hardening. The binding agent should not be dangerous for the users. A bicomponent polyurethane glue with a hardener is an example of a suitable binding agent.

The units produced according to the present invention can, for example, be used as noise protecting walls along roads, vibration dampers on roads or as insulating units in buildings. The units according to the present invention are very advantageous since they are easily formed in the desired dimensions and shapes, even in situ, and since they are modified and machined and moved easily after the solidification.

At present, excavated material, wood or concrete are preferably used as noise protection materials along roads and railways. An essential advantage when using the units according to the invention is that a considerably better sound insulation is obtained than by screens of concrete or wood. Sound measurements have indicated that the only comparable material, as far as the sound absorption power is concerned, is plastic foams or mineral wool, but these are not suitable materials outdoors used as noise protecting screens. A special advantage of the units according to the invention applied as noise protecting screens is, that they absorb the sound and don't just reflect it.

The units are very cheap to produce as well. In comparison with extensive constructions when building up embankments, the costs can be reduced substantially, at the same time as a more effective result is obtained.

When the units are used as noise protecting screens, another advantage is that they can be produced in situ, for example by using a usual concrete mixer, moulds and a lorry with a mobile crane. A special big crane to place the units is not required.

Another advantage of the invention is the arrangements of the holders of the units, which are labour-saving, material saving and which can be adapted in different ways.

A further advantage of the units according to the invention, for example when they are used as noise protecting screens, is that they are easily removable or replaceable. The base of the noise protecting screens is removable, or there are drilled holes in the ground which need not be removed. The environment of the road can be reestablished in a simple way in comparison with the extensive excavation required in the case of constructed embankments.

An additional advantage of the units is that they are produced of waste which harms the environment, the units according to the invention taking care of such materials contributing towards a better environment.

DESCRIPTION OF EMBODIMENT EXAMPLES

The invention is described below by embodiment examples indicated in the drawings, where FIG. 1 shows a noise protecting screen according to the invention, FIG. 2 shows another embodiment example of a noise protecting screen according to the invention, FIG. 3 shows a noise protecting screen according to the invention arranged on an existing noise protecting screen of wood, for example, FIG. 4 shows a diagram concerning the absorption factor of different materials, FIG. 5 shows a diagram concerning the reduction factor of rubber material according to the invention.

FIG. 1 shows a unit 1 produced according to the invention and intended to be used as a noise protecting screen along a road. The screen is produced of old decomposed tyres mixed with a binding agent, especially a bicomponent glue. The glue should have a curing time which is long enough to get the unit completed, produced in situ, including the holders, before the material is solidified. The unit can be put in its position before it is completely solidified.

If noise protecting screens are produced in situ, usual concrete mixers can be used for the mixing of the decomposed rubber material with a binding agent.

The mixture is poured out into a mould, where appropriate after adding of the other component, and is solidified, cold-cured, in the mould. By choosing a bicomponent glue with a setting time which is long enough, there is time enough to arrange holders and lifting arrangements. The bicomponent glue is preferably such that the completed unit is "softened" in a flexible way. The result implies better absorption qualities and a unit which is more easily shaped without getting cracks.

There are means 2 arranged in an appropriate way to form holders for the prepared unit. These means can consist of two or more metal tubes imbedded in the material in the mould. The outer end of the tube (tubes) is on the same level as a face 3 of the element. The unit is placed by means of separate rods pushed into the tubes, the other end of each rod being pushed into a drilled hole in the ground or in a tube which is fixed in a foundation or in the ground.

The means 2 can also consist of rods, the one end of which protruding outside the face 3, the rods being placed in holes arranged in the position where the unit is to be located.

Other means to arrange the element are useful as well, for example stabilising frames, hanging means, supports, console means or the like.

It is also appropriate to arrange means for lifting the completed unit. These means can consist of a hook, a lifting eye bolt 4 or the like, making the lifting of the unit easier.

The unit 1 can consist of a noise protecting screen adapted to be suspended or arranged in another way on an existing noise protecting screen 5 of concrete, for example, or of wood, to improve the sound absorption, see FIG. 3. In this case the holder can consist of a suspension device 6 or the like, which cooperates with tubes 7 imbedded in the unit.

FIG. 4 shows a diagram of the absorption factor of the unit according to the invention, the unit having a thickness of about 30 cm.

FIG. 5 shows the reduction factor of the unit according to the invention, the unit having a thickness of about 30 cm.

Figure 1:
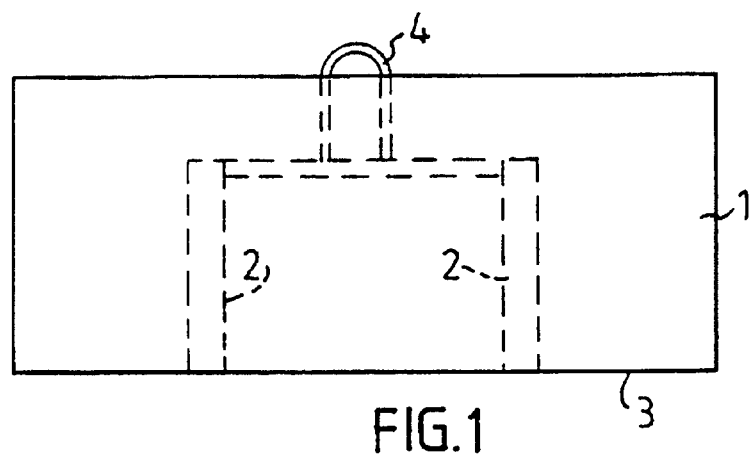
Figure 2:
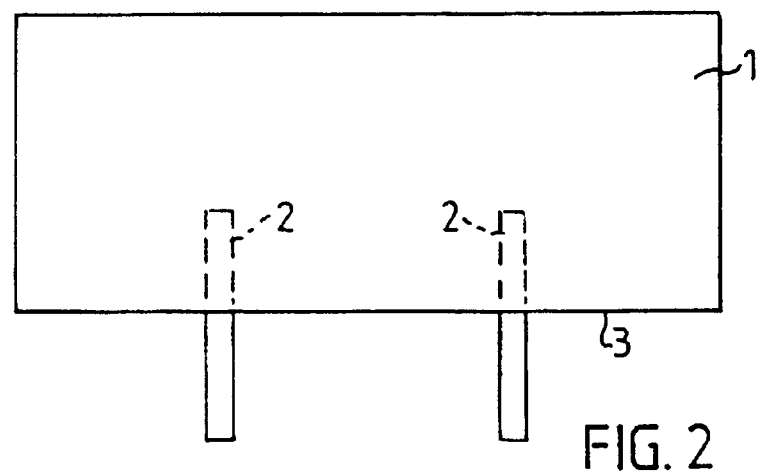
Figure 3:
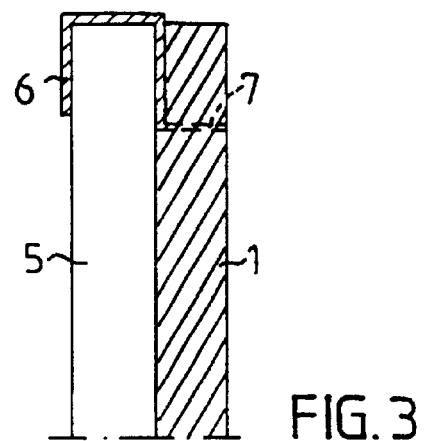

According to FIGS. 4 and 5 it appears from the values measured that the method according to the invention gives units having very good values relating to the sound absorption and the reduction factor, making the units very suitable to be used as noise protecting screens, especially outdoors.

It is obvious for the man skilled in the art that the units according to the invention can be designed in different sizes, thicknesses, with different designs and profiles, and in different colours according to one's wishes.

What is claimed is:

1. A method for producing sound absorbing railway units constructed of rubber waste material, the method comprising the steps of:

configuring a mold in the shape of a unit to be manufactured, said mold adapted to support a holder that is arranged to extend therein;

decomposing the rubber waste;

mixing a bicomponent glue used as a binding agent with said decomposed rubber waste to form a mixture;

pouring the mixture into said mold;

solidifying said mixture by cold-setting to form the unit; and removing said unit from the mold;

wherein said units are adapted to be placed alongside a railway, said binding agent creating a unit having resilient and sound-absorbing properties.

2. The method according to claim 1 wherein said holder comprises at least one tube disposed in the mixture prior to solidification, wherein one end of a rod is placed into at least one of said tubes and another end of said rod is placed into a hole formed by a foundation arranged alongside the railway.

3. The method according to claim 1 wherein said holder comprises at least one rod disposed in the mixture prior to solidification, one end of said rod extending beyond said unit after solidification and adapted to be placed into a hole formed by a foundation arranged alongside the railway.

4. The method according to claim 1 wherein the holder comprises a fastening means for fastening said completed unit along an existing noise absorbing fence.

5. The method according to claim 1 wherein the holder comprises a lifting eye bold arranged in the mixture prior to solidification.

6. The method according to claim 1 wherein the decomposed rubber waste and the binding agent are mixed in situ in a concrete mixer and poured into said mold therefrom.

7. The method according to claim 1 wherein said units have a profiled surface.

8. A railway sound absorbing unit constructed of rubber waste mixed with a binding agent and bonded together, said binding agent having resilient cold-setting properties that creates a unit having resilient and sound-absorbing properties, said unit having at least one holder adapted to connect to at least one foundation positioned alongside a railway.

9. A method for producing sound absorbing railway units constructed of rubber waste material, the method comprising the steps of:

configuring a mold in the shape of a unit to be manufactured, said mold adapted to support a holder that is arranged to extend therein;

decomposing the rubber waste;

mixing a bicomponent glue used as a binding agent with said decomposed rubber waste to form a mixture;

pouring the mixture into said mold;

solidifying said mixture by cold-setting to form the unit; and removing said unit from the mold;

wherein said units are adapted to be placed alongside a railway, said binding agent creating a unit having soft, resilient and sound-absorbing properties.

* * * * *